(12) United States Patent
Lane

(10) Patent No.: US 7,436,081 B2
(45) Date of Patent: Oct. 14, 2008

(54) SYSTEM FOR CONTROLLING A HYBRID ENERGY SYSTEM

(75) Inventor: William H. Lane, Chillicothe, IL (US)

(73) Assignee: Caterpillar Inc., Peoria, IL (US)

(\*) Notice: Subject to any disclaimer, the term of this patent is extended or adjusted under 35 U.S.C. 154(b) by 63 days.

(21) Appl. No.: 11/700,194

(22) Filed: Jan. 31, 2007

(65) Prior Publication Data

US 2008/0179891 A1 Jul. 31, 2008

(51) Int. Cl.
*F02C 9/40* (2006.01)
(52) U.S. Cl. .................................... 290/40 C
(58) Field of Classification Search ............... 290/40 C
See application file for complete search history.

(56) References Cited

U.S. PATENT DOCUMENTS

| | | | | |
|---|---|---|---|---|
| 4,637,209 A | * | 1/1987 | Clark | 60/595 |
| 5,789,881 A | * | 8/1998 | Egami et al. | 318/139 |
| 5,820,172 A | | 10/1998 | Brigham et al. | |
| 5,932,940 A | * | 8/1999 | Epstein et al. | 310/40 MM |
| 6,330,498 B2 | | 12/2001 | Tamagawa et al. | |
| 6,367,570 B1 | | 4/2002 | Long, III et al. | |
| 6,615,118 B2 | * | 9/2003 | Kumar | 701/19 |
| 6,870,279 B2 | * | 3/2005 | Gilbreth et al. | 290/52 |
| 6,958,550 B2 | * | 10/2005 | Gilbreth et al. | 290/52 |
| 6,998,727 B2 | | 2/2006 | Gray, Jr. | |
| 7,030,580 B2 | | 4/2006 | Hoff | |
| 7,137,344 B2 | | 11/2006 | Kumar et al. | |
| 7,143,859 B2 | * | 12/2006 | Ohtsukasa | 180/307 |
| 7,146,266 B2 | | 12/2006 | Teslak et al. | |
| 2001/0039230 A1 | * | 11/2001 | Severinsky et al. | 477/3 |
| 2006/0022469 A1 | | 2/2006 | Syed et al. | |
| 2006/0145482 A1 | | 7/2006 | Roethler et al. | |
| 2007/0267997 A1 | * | 11/2007 | Kanazawa et al. | 320/108 |

FOREIGN PATENT DOCUMENTS

JP 2007246009 A \* 9/2007

\* cited by examiner

*Primary Examiner*—Joseph Waks
(74) *Attorney, Agent, or Firm*—Finnegan, Henderson, Farabow, Garrett & Dunner

(57) ABSTRACT

A method and apparatus are disclosed for controlling a hybrid energy system including at least an energy source having a maximum energy output and an energy storage device. The method includes determining a first amount of energy indicative of an amount of energy associated with the current operating condition of the energy source and determining a second amount of energy indicative of energy associated with the energy storage device. The method also includes estimating a third amount of energy indicative of a difference between the first amount of energy and the maximum energy output. The method further includes controlling the energy source as a function of the second and third amounts of energy.

20 Claims, 2 Drawing Sheets

SYSTEM FOR CONTROLLING A HYBRID ENERGY SYSTEM

TECHNICAL FIELD

The present disclosure relates to a hybrid energy system and, more particularly, to a method and apparatus for controlling a hybrid energy system.

BACKGROUND

Hybrid energy systems typically include a an engine having its prime mover, e.g., a crankshaft, mechanically decoupled from a driven load, e.g., a transmission operatively connected to one or more traction devices. The engine is usually hydraulically or electrically coupled to the load allowing the engine to operate as an energy source rather than a conventional drive mechanism. As such, the engine may be operable at a relatively more desirable operating condition, e.g., at an operating condition consuming relatively less fuel. However, engine output at a given operating condition may be insufficient to satisfy demanded energy, e.g., when an operator and/or the driven load demands more energy than the engine is capable of outputting at the given operating condition. Hybrid energy systems usually also include an energy storage device to receive energy from the engine when engine output is sufficient to satisfy the demanded energy and provide additional energy to the driven load when engine output is insufficient. Controlling the operating condition of the engine, the amount and/or timing of energy delivered from the engine to the energy storage device, and the amount of energy available from the energy storage device, may impact the benefits achievable by a hybrid energy system with respect to conventional drive mechanisms.

U.S. Pat. No. 7,137,344 ("the '344 patent") issued to Kumar et al. discloses a hybrid energy load control system and two control methods. Each method includes sensing the current power generated by a power source and sensing a commanded power of the power source by monitoring an operator input. Each method also determines the difference between the current power and the commanded power and controls the delivery of power from the power source to a driven load and to an energy storage system. In the first method, if the current power is less than the commanded power, a controller increases the power output to exceed the commanded power and directs the portion of the increased power that exceeds the commanded power to the energy storage system. In the first method, if the current power is greater than the commanded power, the controller maintains the current power and directs the portion of the current power that exceeds the commanded power to the energy storage system. In the second method, if the current power is less than the commanded power, the controller increases the power output and directs power within the energy storage system to the driven load. In each method, the controller ceases to direct a portion of the power output to the energy storage system after an elapsed period of time.

Although, the methods of the '344 patent may control the delivery of power from the power source to the driven load and the energy storage system as a function of the difference between the current and commanded power, the power source may direct power to the energy storage device during high load scenarios. Additionally, by not monitoring the power within the energy storage device, the methods of the '344 patent may passively direct energy thereto instead of optimizing the amount of energy directed to and stored within the energy storage device. Each of which may increase the frequency of the power source operating in relatively less desirable operating condition, e.g., an operating condition having relatively high fuel consumption or relatively high emissions.

The present disclosure is directed to overcoming one or more of the shortcomings set forth above.

SUMMARY OF THE INVENTION

In one aspect, the present disclosure is directed to a method for controlling a hybrid energy system that includes at least an energy source having a maximum amount of energy and a energy storage device. The method includes determining a first amount of energy indicative of an amount of energy associated with the current operating condition of the energy source and determining a second amount of energy indicative of energy associated with the energy storage device. The method also includes estimating a third amount of energy indicative of a difference between the first and maximum amounts of energy. The method further includes controlling the energy source as a function of the second and third amounts of energy.

In another aspect, the present disclosure is directed to a hybrid energy system. The system includes a first source of energy configured to output a variable amount of first energy between a maximum energy and a minimum energy and a second source of energy configured to store a variable amount of second energy. The system also includes a controller configured to estimate a first value indicative of a difference between the first energy and the maximum energy, determine a second value indicative of the second energy, and affect control of the first source to selectively change the first energy as a function of the first value and the second value.

DETAILED DESCRIPTION

Figure 1:
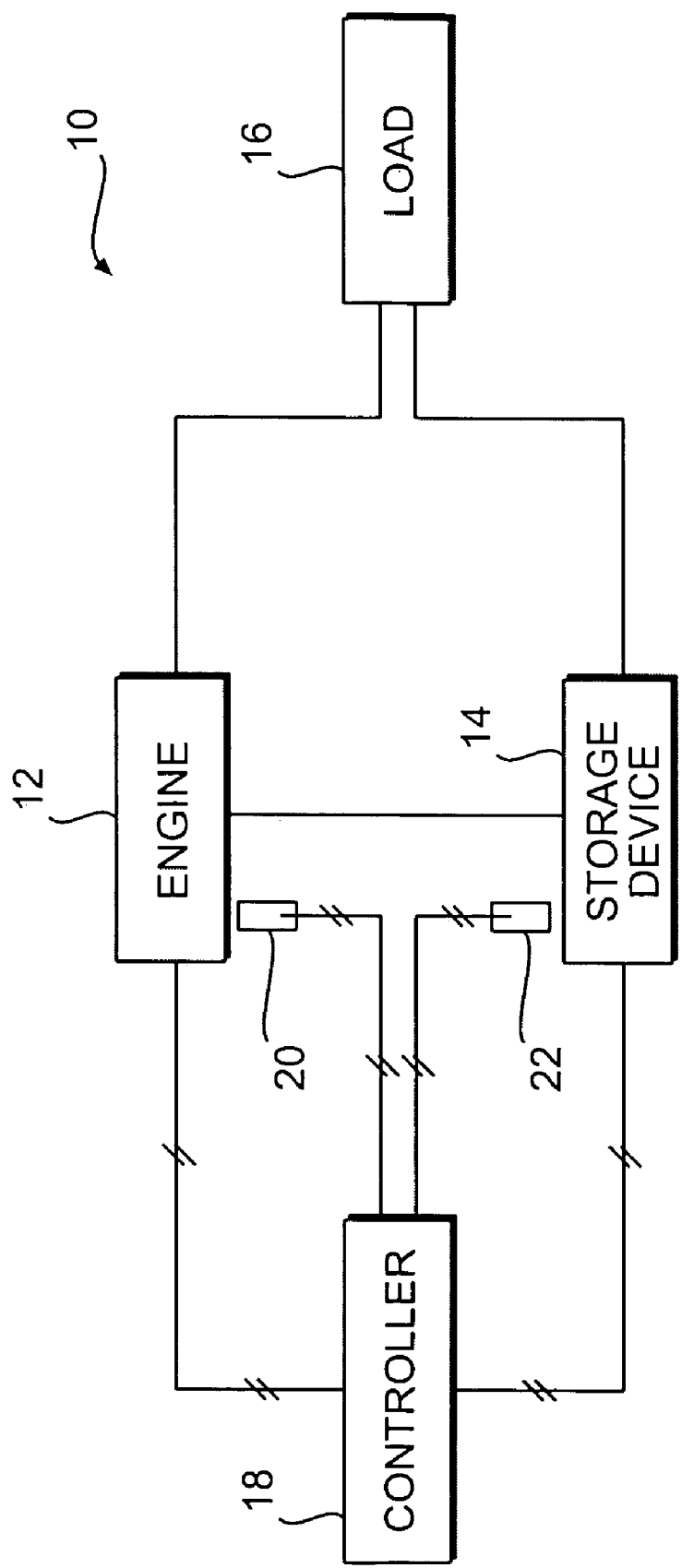
FIG. 1 is a diagrammatic illustration of an exemplary hybrid energy system in accordance with the present disclosure.

FIG. 1 illustrates an exemplary hybrid energy system 10. Specifically, system 10 may include an engine 12, a storage device 14, a controller 18 and may be configured to selectively supply energy to and/or receive energy from a load 16. Engine 12 may be operatively connected to storage device 14 and load 16 to selectively supply power thereto. Storage device 14 may be operatively connected to engine 12 to selectively receive and supply power with respect to engine 12 and may be operatively connected to load 16 to selectively supply power thereto. System 10 may be operatively associated with a machine, such as, for example, a locomotive, an on- or off-highway vehicle, a generator set, and/or other work performing machine. It is contemplated that system 10 may include one or more additional and/or different components, such as, for example, a transmission device, gearing, electrical and/or hydraulic conduits, and/or other components known in the art. It is also contemplated that the components of system 10, e.g., engine 12, storage device 14, and load 16, may be interconnected via any conventional method or apparatus as is know in the art.

Engine 12 may include any source of power, for example, a gasoline or diesel combustion engine, a fuel cell, a natural gas engine, and/or any other energy producing device known in the art. Engine 12 may also include a prime mover, e.g., a crankshaft, (not shown) that is mechanically decoupled from storage device 14 and load 16. Engine 12 may be operatively connected to storage device 14 and load 16 via an electrical and/or hydraulic circuit and may effectively operate as a source of energy. Engine 12 may be controlled by controller 18 to selectively vary the amount of energy output therefrom as a function of controller 18 varying one or more operating parameters of engine 12, e.g., an amount of fuel injected into a combustion chamber or the timing of intake and exhaust valves.

Storage device 14 may include any source of energy, such as, for example, a hydraulic and/or electrical circuit and may be configured to selectively receive and store energy. For example, storage device 14 may include a hydraulic circuit including a fixed or variable displacement pump receiving energy from engine 12 to establish and deliver pressurized fluid to an accumulator. As such, storage device 14 may convert energy received from engine 12 into hydraulic energy, e.g., pressurized fluid, and may store the hydraulic energy within the accumulator. For another example, storage device 14 may include an electrical circuit including a motor-generator set receiving energy from engine 12 to establish and deliver an electrical current to a battery. As such, storage device 14 may convert energy received from engine 12 into electrical energy, e.g., electrical current and/or voltage, and may store the electrical energy within the battery. It is contemplated that storage device 14 may include any quantity, type, and/or size of pumps, accumulators, motor-generator sets, batteries, and/or other components known in the art. It is also contemplated that storage device 14 may include one or more capacitors configured to store electrical energy and that the motor-generator set may or may not be a combined unit. It is further contemplated that storage device 14 may be configured to selectively receive energy from load 16, e.g., when load 16 adds energy to system 10.

Load 16 may include one or more driven components of a machine such as, for example, one or more traction devices configured to propel a vehicle relative to a surface, one or more reciprocating or rotating elements of a generator set, and/or any type of load known in the art. Load 16 may be a variable load and may dynamically change during operation of system 10 and may affect one or more operating parameters of engine 12 and/or storage device 14 to correspondingly change. For example, load 16 may vary as traction devices interact with different materials and/or different grades of a surface, load 16 may vary as inertia of one or more driven components increases or decreases, and/or may vary in any manner known in the art. It is contemplated that one or more operating parameters of engine 12 may also be changed by an operator and/or by controller 18 as a function of load 16.

Controller 18 may include one or more microprocessors, a memory, a data storage device, a communications hub, and/or other components known in the art. Specifically, controller 18 may monitor one or more parameters of system 10 and may affect the operation of engine 12 and/or storage device 14. It is contemplated that controller 18 may be integrated within a general machine control system capable of controlling additional various functions of the machine with which system 10 may be associated. Controller 18 may be configured to receive input signals from one or more sensors 20, 22, perform one or more algorithms to determine appropriate output signals, and may deliver the output signals to affect control of engine 12 and/or storage device 14. For example, controller 18 may control the amount of fuel delivered to engine 12, the timing of intake and exhaust valves associated with engine 12, the position of one or more valves associated with storage device 14, the directional flow of pressurized fluid or electrical current associated with storage device 14, additional functions and/or parameters associated with engine 12 and/or storage device 14 known in the art, and/or one or more combinations thereof. It is contemplated that controller 18 may receive and deliver signals via one or more communication lines (not referenced) as is known in the art.

Sensors 20, 22 may include may each include one or more conventional sensors configured to establish a signal as a function of a sensed physical parameter. Sensors 20 may be configured to sense one or more operating parameters of engine 12. For example, sensors 20 may be configured to sense an amount or rate of delivered fuel, rotational speed of a crankshaft, exhaust or intake valve timing, manifold pressures and/or temperatures, coolant temperature, any other parameter known in the art, and/or any combination thereof. Sensors 22 may be configured to sense one or more operating parameters of storage device 14. For example, sensors 22 may be configured to sense a charge or voltage associated with a battery, a pressure or flow rate of pressurized fluid, a position of an accumulator piston, displacement of a pump, any other parameter known in the art, and/or combinations thereof. It is contemplated that sensors 20, 22 may include a plurality of sensors establishing a plurality of signals with respect to a common operating parameter and that the plurality of signals may be combinable into a common signal by, for example, averaging or summing. It is also contemplated that sensors 20, 22 may embody any type of sensor known in the art, such as, for example, infrared or radar sensors, flow meters, thermocouples, pressure transducers, and/or any other sensor known in the art. It is further contemplated that sensors 20, 22 may be disposed at any location relative to engine 12 and storage device 14, respectively.

Figure 2:
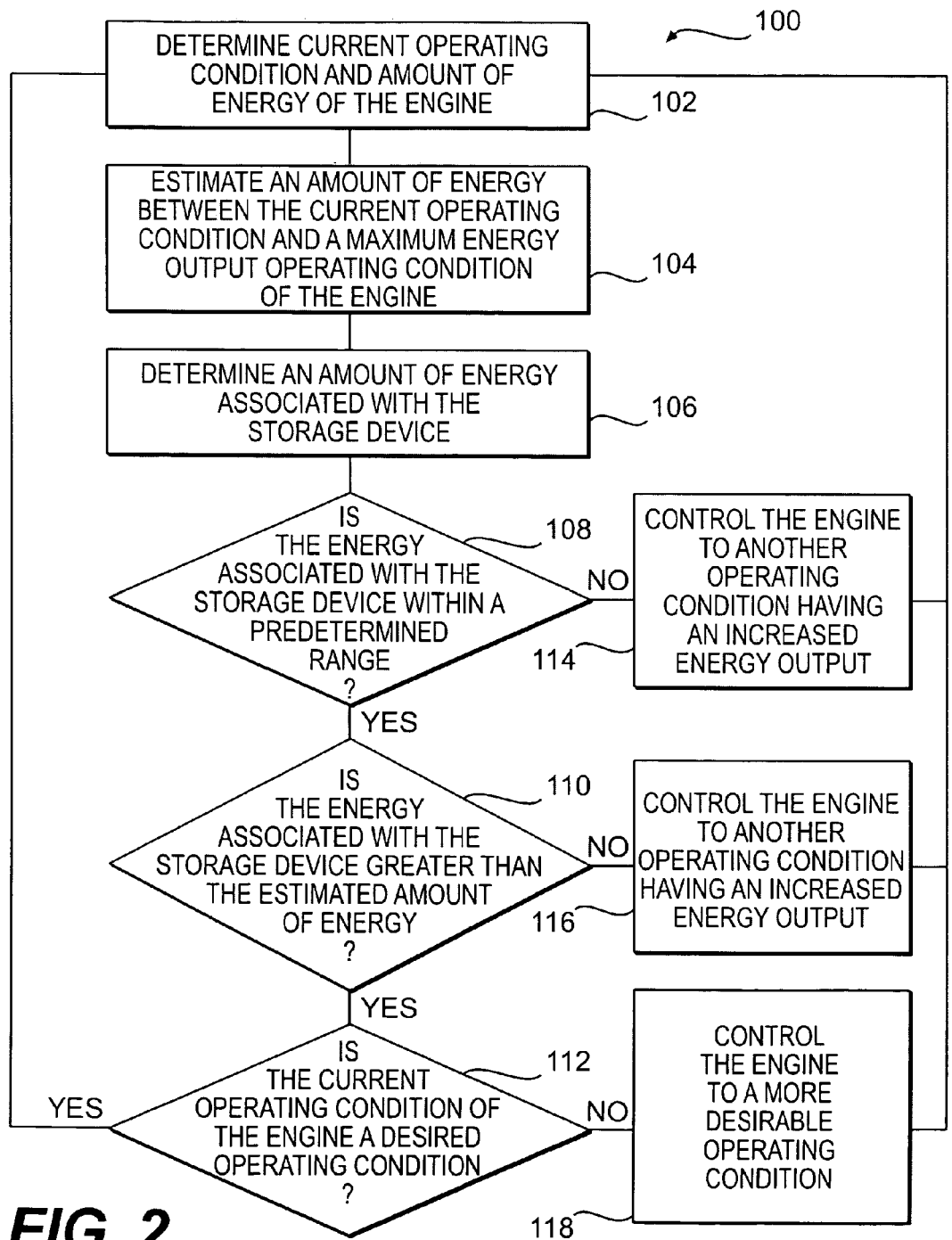
FIG. 2 is a schematic illustration of an exemplary control algorithm configured to be performed by the controller of FIG. 1.

FIG. 2 illustrates an exemplary control method 100. Method 100 may be performed by controller 18 to control system 10. Specifically, method 100 may monitor one or more operating parameters of system 10, engine 12, and/or storage device 14 and may determine one or more commands to control engine 12 to one or more operating conditions thereof. Method 100 may include determining a current operating condition of engine 12 and an amount of energy associated therewith, step 102, and may include estimating an amount of energy between the current operating condition of engine 12 and a maximum energy output operating condition of engine 12, step 104. Method 100 may also include determining an amount of energy associated with storage device 14, step 106, and may include determining if the amount of energy associated with storage device 14 is within a predetermined range, step 108. Method 100 may also include determining if the amount of energy associated with storage device 14 is greater than the estimated amount of energy determined within step 104, step 110, and may include determining if the current operating condition of engine 12 is a desired operating condition. Method 100 may further include controlling engine 12 to another operating condition having an increased energy output if the amount of energy associated with storage device 14 is not within the predetermined range, step 114, controlling engine 12 to another operating condition having an increased energy output if the amount of energy associated with storage device 14 is not within the predetermined range, step 116, and may include controlling engine 12 to a more desirable operating condition if engine 12 is not operating at a desired operating condition, step 118. It is contemplated that the steps described below may be performed in any order and are described herein with a particular order for exemplary purposes only. It is also contemplated that control algorithm 100 may be performed continuously and/or periodically, with or without a uniform frequency.

Step 102 may include determining a current operating condition of engine 12 and an amount of energy associated therewith. Specifically, step 102 may include controller 18 receiving one or more signals from sensors 20 indicative of one or more operating parameters of engine 12 and performing one or more algorithms to estimate an operating condition and an amount of energy output by engine 12 when operating at the estimated operating condition. For example, if engine 12 is a diesel engine, step 102 may include controller 18 receiving a signal indicative of a rate that fuel may be delivered to engine 12 and accessing a multi-dimensional map functionally relating fuel rates, operating conditions, and energy output. It is contemplated that step 102 may include controller 18 receiving one or more signals indicative of one or more operating parameters of engine 12, e.g., rotational speed of a crankshaft, intake and/or exhaust manifold temperatures, coolant temperature, intake air rate, valve timing, exhaust rate and/or composition, and/or any other operating parameter associated with engine 12 and accessing any number of multi-dimensional maps functionally relating such parameters with engine operating conditions and energy output.

Step 104 may include estimating an amount of energy between the current operating condition of engine 12 and a maximum energy output operating condition of engine 12. Engine 12 may include a maximum energy output operating condition as a function of physical parameters of engine 12. For example, if engine 12 is a diesel engine, a maximum energy output operating condition may be a function of the displacement volume of the combustion chambers. For example, step 104 may include controller 18 subtracting the amount of energy associated with the current operating condition from the amount of energy associated with the maximum amount of energy to estimate the amount of energy between the current and maximum operating conditions of engine 12. It is contemplated that the maximum amount of energy engine 12 might output may be analytically determined and/or estimated for a particular engine 12 or a given type or kind of engine 12, via, for example, experimental data, laboratory results, test data, and/or any other suitable method.

Step 106 may include determining an amount of energy associated with storage device 14. Specifically, step 106 may include controller 18 receiving one or more signals from sensors 22 indicative of one or more operating parameters of storage device 14 to estimate an amount of energy available from storage device 14. For example, if storage device 14 is an accumulator, step 106 may include controller 18 receiving a signal indicative of a pressure of pressurized fluid within the accumulator and accessing a multi-dimensional map functionally relating pressure or pressurized fluid and energy. For example, if storage device 14 is a battery, step 106 may include controller 18 receiving a signal indicative of a voltage within the battery and accessing a multi-dimensional map functionally relating voltage and energy. It is contemplated that step 106 may include determining an amount of energy associated with storage device 14 as a function of any parameter known in the art.

Step 108 may include determining if the amount of energy associated with storage device 14 is within a predetermined range. Specifically, step 108 may include controller 18 comparing the amount of energy determined within step 106 with one or more predetermined values. Step 108 may include determining if the amount of energy associated with storage device 14 is greater than a first predetermined value, e.g., a minimum value. Step 108 may also include determining if the amount of energy associated with the storage device is less than a second predetermined value, e.g., a maximum value. It is contemplated that step 108 may or may not include determining if the amount of energy associated with storage device 14 is less than a predetermined value, thus, only determining if the amount of energy associated with storage device 14 is greater than a minimum value.

Step 110 may include determining if the amount of energy associated with storage device 14, e.g., as determined within step 106, is greater than the estimated amount of energy between the current operating condition of engine 12 and a maximum energy output operating condition of engine 12, e.g., as determined within step 104. Specifically, step 110 may include controller 18 comparing the amount of energy determined within step 106 is greater than the amount of energy determined in step 104.

Step 112 may include determining if the current operating condition of engine 12 is a desired operating condition. Specifically, step 112 may include controller 18 receiving one or more signals from sensors 20 indicative of one or more operating parameters of engine 12 and performing one or more algorithms to functionally relate one or more of the received signals with one or more predetermined values. Step 112 may include determining if one or more operating parameters are greater than, less than, and/or within a range of predetermined values. For example, step 112 may include determining if a rate of fuel delivered to engine 12 is within a predetermined range of fuel rates and, if so, determine that engine 12 is operating at a desired operating condition. Additionally, step 112 may include determining if an amount of exhaust and/or an amount of emissions is greater than a predetermined value and, if so, determine that engine 12 is not operating at a desired operating condition. It is contemplated that any operating parameter may be compared according to any criteria to determine if engine 12 is operating at a desired operating condition.

Steps 114, 116 may each include controlling engine 12 to another operating condition having an increased energy output with respect to the current operating condition. Specifically, steps 114, 116 may include controller 18 adjusting and/or changing one or more operating parameters of engine 12 to increase the energy output. For example, if engine 12 is a diesel engine, steps 114, 116 may include controller 18 increasing a rate at which fuel may be delivered to engine 12, e.g., to the combustion chambers thereof. It is contemplated that increased amount of energy output by engine 12 may be directed toward storage device 14 to increase the amount of energy associated therewith. It is also contemplated that steps 114, 116 may include controller 18 affecting control of engine 12 by modifying any operating parameter of engine 12 known in the art to increase the energy output thereof. It is contemplated that steps 114, 116 may include controlling engine 12 to any amount of energy greater than the amount of energy associated with the current operating condition.

Step 118 may include may include controlling engine 12 to a more desirable operating condition. Specifically, step 118 may include controller 18 adjusting and/or changing one or more operating parameters of engine 12 to change the operating condition thereof. For example, if engine 12 is a diesel engine, step 118 may include controller 18 decreasing a rate at which fuel may be delivered to engine 12, e.g., to the combustion chambers thereof. It is contemplated that step 118 may include controller 18 affecting control of engine 12 by modifying any operating parameter of engine 12 known in the art to control engine 12 to a more desirable operating condition. It is also contemplated that a more desirable operating condition may be established according to any criteria.

It is contemplated that any of the steps of method 100 may include controller 18 performing one or more algorithms to adjust or modify a determined or estimated amount of energy associated with engine 12 and/or storage device 14 as a function of the inertia associated and/or inherent with system 10 and/or the components of engine 10. For example, method 100 may account for the inertia of engine 12 and the energy associated therewith, e.g., the energy necessary to rotate a crankshaft and/or operating a cam drive to open and close valves associated with a diesel engine. For another example, method 100 may account for the inertia of storage device 14 and the energy associated therewith, e.g., the energy necessary to reciprocate one or more pistons of a variable displacement pump. It is also contemplated that any of the steps of method 100 may include controller 18 performing any type of algorithm, e.g., access one or more multi-dimensional maps and/or look-up tables, perform one or more equations, and/or include any other type of algorithm known in the art. It is contemplated that the data associated with any algorithm of steps 102, 104, 106, may be analytically determined and/or estimated for a particular engine 12 or a given type or kind of engine 12, via, for example, experimental data, laboratory results, test data, and/or any other suitable method. It is further contemplated that any of the comparison algorithms, e.g., the algorithms associated with steps 108, 110, 112, may respectively alternatively include greater than or equal and/or less than or equal, as appropriate.

INDUSTRIAL APPLICABILITY

The disclosed method and apparatus may be applicable to control any hybrid energy system. The disclosed method and apparatus may advantageously control energy output of a power source, e.g., engine 12, with respect to changing loads while maintaining a desirable amount of stored energy, e.g., energy associated with storage device 14. The operation of method 100 is explained below.

Referring to FIG. 1, system 10 may be operated to affect a desired manipulation of load 16. For example, load 16 may be a traction load of a vehicle with respect to a surface and may change as a function of the current speed and/or acceleration of the vehicle, an operator demand to change the speed and/or acceleration, the grade of the surface, and/or other factors known in the art.

As load 16 transitions from rest to steady state operation, the energy required by load 16 may decrease. For example, if load 16 is a traction load, the amount of energy required to accelerate a vehicle from rest to steady state speed may be substantially greater than the amount of energy required to maintain the vehicle at the steady state speed. However, as load 16 subsequently changes, the energy required may correspondingly change. For example, an increase in load, e.g., an operator demanded acceleration or a increase in surface grade, may require an increased amount of energy to be supplied from engine 12 and/or storage device 14. Additionally, a decrease in load, e.g., an operator demanded deceleration or a decrease in surface grade, may require a decreased amount of energy supplied from engine 12 and/or storage device 14. Engine 12 may be controlled by controller 18 to operate in relatively more desirable, e.g., lower fuel consuming or lower emission producing, operating conditions. Such operating conditions may be a high speed-low torque operating condition capable of maintaining the steady state operation but may also be undesirably slow in responding to increasing demands, e.g., transient operation.

Energy from storage device 14 may be selectively supplied to load 16 and/or engine 12 to supplement the energy supplied therefrom and decrease the time required to respond to the increased load demands. Storage device 14 may receive energy from engine 12, may store the received energy, and may supply the stored energy to engine 12 and/or load 16. The energy associated with storage device 14, however, may be limited by the physical parameters, e.g., size of an accumulator, size of a battery, and/or other parameters. Method 100 may affect control of engine 12 and storage device 14 to improve the timing of when energy may be directed from engine 12 to storage device 14, the amount of energy stored within storage device 14, and the operation of engine 12 to relatively more desirable operating conditions.

Referring to FIG. 2, controller 18 may perform one or more of the steps associated with method 100 to affect control of engine 12 and storage device 14. Controller 18 may determine the current operating condition and an amount of energy output by engine 12, step 102, as a function of the one or more signals received from sensors 20. For example, controller 18 may determine that engine 12 is operating at a high speed-low torque operating condition to maintain a steady state operation of load 16. The given high speed-low torque operating condition may not be the maximum output operating condition of engine 12. That is, engine 12 may be operable to one or more additional operating conditions capable of providing relatively greater amounts of energy to load 16.

Controller 18 may estimate the amount of energy between the current operating condition and the maximum energy output operating condition of engine 12, step 104. The maximum energy output operating condition may be, for example, a high speed-high torque operating condition. Although engine 12 may be operable at a high-speed-high torque operating condition, the engine may consume relatively more fuel and/or produce more emissions than at a high speed-low torque operating condition. Thus, it may be more desirable to operate engine 12 at a high speed-low torque operating condition, but, changes in load 16 and/or operator demanded acceleration may require more energy than engine 12 may be capable of providing at the high speed-low torque operating condition. In such instances, engine 12 may experience a time delay when transitioning from the high speed-low torque to the high speed-high torque operating condition. The operator may consider this time delay undesirable, e.g., because of a decrease in the speed of load 16 as load 16 increases or because of a slow acceleration of load 16 when the operator demands an acceleration. Accordingly, energy stored within storage device 14 may be selectively supplied to engine 12 and/or load 16 to supplement the amount of energy produced by engine 12 to decrease the time delay of engine 12.

Controller 18 may determine an amount of energy associated with storage device 14, step 106, as a function of the one or more signals received from one or more sensors 22. For example, controller 18 may determine that storage device 14 presently stores approximately half of the total amount of energy that storage device 14 may be capable of storing. As such, storage device 14 may be capable of receiving energy from engine 12 to increase the amount of energy stored therein and/or may be capable of delivering energy to engine 12 and/or load 16.

It may be desirable to control the amount of energy associated with storage device 14 to be within a predetermined range, e.g., at least greater than a minimum amount of energy, step 108, and to be greater than the estimated amount of energy between the current operating condition of engine 12 and the maximum energy output condition, 110. As such, storage device 14 may be configured to supplement the amount of energy produced by engine 12 and thus decrease the time delay thereof during increases in load 16 and/or operator demanded acceleration. However, merely maintaining the energy associated with storage device 14 at a maximum may undesirably require increased energy output from engine 12 which may result in engine 12 operating in a relatively less desirable operating condition. Similarly, merely maintaining the energy associated with storage device 14 at a minimum amount of energy may undesirably reduce the ability of storage device 14 to supplement the amount of energy produced by engine 12 and offset the time delay associated with increasing load 16 and/or operator demanded acceleration.

Controller 18 may determine if the energy associated with storage device 14 is within a predetermined range, step 108. If not, controller 18 may control engine 12 to another operating condition having an increased energy output, step 114. As such, controller 18 may control engine 12 to an operating condition to produce an amount of energy capable of maintaining the operation of load 16 and increasing the amount of energy associated with storage device 14. It is contemplated that controller 18 may control engine 12 to any operating condition having any amount of increased energy. If the energy associated with storage device 14 is within the predetermined range, controller 18 may determine if the energy associated with storage device 14 is greater than the estimated amount of energy, step 110. If not, controller 18 may control engine 12 to another operating condition having an increased energy output, step 116. As such, controller 18 may control engine 12 to an operating condition to produce an amount of energy capable of maintaining the operation of load 16 and increasing the amount of energy associated with storage device 14. It is contemplated that controller 18 may control engine 12 to any operating condition having any amount of increased energy.

If the energy associated with storage device 14 is greater than the estimated amount of energy, controller 18 may determine if the current operating condition of engine 12 is a desirable operating condition, step 112. If not, controller 18 may control engine 12 to a more desirable operating condition, e.g., an operating condition consuming relatively less fuel and/or producing relatively less emissions, step 118. As such, controller 18 may reduce the energy output of engine 12 to an operating condition to produce an amount of energy capable of maintaining the operation of load 16. It is contemplated that controller 18 may control engine 12 to any operating condition that is more desirable than the current operating condition. Controller 18 may, after any one of steps 112, 114, 116, 118, again determine the current operating condition and an amount of energy output by engine 12, step 102, and method 100 may be repeated to dynamically control the operation of engine 12 and storage device 14.

Because method 100 affects control of engine 12 as a function of the amount of energy associated with storage device 14 and the difference between the current energy output and the maximum energy output of engine 12, energy may not be supplied to storage device 14 during high load scenarios. Additionally, by monitoring the amount of energy associated with storage device 14, engine 12 may be less frequently operated at undesirable operating conditions.

It will be apparent to those skilled in the art that various modifications and variations can be made to the disclosed system for controlling a hybrid energy system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for controlling a hybrid energy system including at least an energy source having a maximum energy output and a energy storage device, the method comprising:
    determining a first amount of energy indicative of an amount of energy associated with the current operating condition of the energy source;
    determining a second amount of energy indicative of energy associated with the energy storage device;
    estimating a third amount of energy indicative of a difference between the first amount of energy and the maximum energy output; and
    controlling the energy source as a function of the second and third amounts of energy.

2. The method of claim 1, further including controlling the energy source to another operating condition having an amount of energy greater than the first amount of energy if the second amount of energy is not within a predetermined range.

3. The method of claim 1, further including controlling the energy source to another operating condition having an amount of energy greater than the first amount of energy if the second amount of energy is less than the third amount of energy.

4. The method of claim 3, further including:
    comparing the second amount of energy with a predetermined range;
    comparing the second amount of energy with the third amount of energy; and
    subsequently determining if the current operating condition is at a desired operating condition if the second amount of energy is within the predetermined range and greater than the third amount of energy.

5. The method of claim 4, further including controlling the power source to another operating condition if the current operating condition is not a desired operating condition.

6. The method of claim 1, wherein the hybrid energy system further includes a controller configured to determine the first, second, and third amounts of energy and affect control of the energy source.

7. A hybrid energy system comprising:
    a first source of energy configured to output a variable amount of first energy between a maximum energy and a minimum energy;
    a second source of energy configured to store a variable amount of second energy; and
    a controller configured to:
        estimate a first value indicative of a difference between the first energy and the maximum energy,
        determine a second value indicative of the second energy, and
        affect control of the first source to selectively change the first energy as a function of the first value and the second value.

8. The system of claim 7, further including a load operatively connected to the first and second sources and configured to selectively receive energy from each of the first and second sources.

9. The system of claim 7, further including:
    at least one first sensor configured to produce at least one first signal indicative of at least one operating parameter of the first source; and
    at least one second sensor configured to produce at least one second signal indicative of at least one operating parameter of the second source.

10. The system of claim 7, wherein the controller is further configured to increase the amount of first energy if the amount of second energy is less than a predetermined value.

11. The system of claim 7, wherein the controller is further configured to increase the amount of first energy if the amount of second energy is less than the first value.

12. The system of claim 7, wherein the controller is further configured to determine if the first source is operating at a desired operating condition if the amount of first energy is greater than a predetermined value and greater than the first value.

13. The system of claim 12, wherein the controller is further configured to control the first source to another operating condition if the first source is not operating at a desired operating condition.

14. The system of claim 12, wherein determining if the first source is operating at a desired operating condition includes determining whether the first source is operating within a predetermined range of emission production values.

15. The system of claim 12, wherein determining if the first source is operating at a desired operating condition includes determining whether the first source is operating within a predetermined range of fuel consumption values.

16. A method of controlling a hybrid energy system having an engine and an energy storage device, comprising:
   determining a first amount of energy associated with the engine;
   estimating a second amount of energy indicative of a difference between the first amount of energy and a predetermined amount of energy;
   determining a third amount of energy associated with the energy storage device; and
   controlling the operation of the engine as a function of the second and third amounts of energy.

17. The method of claim 16, wherein:
   the first amount of energy is indicative of an amount of energy output by the engine at a current operating condition; and
   controlling the operation of the engine further includes affecting the engine to operate at another operating condition having an increased energy output with respect to the current operating condition when the third amount of energy is less than a predetermined value.

18. The method of claim 16, wherein:
   the first amount of energy is indicative of an amount of energy output by the engine at a current operating condition; and
   controlling the operation of the engine further includes affecting the engine to operate at another operating condition having an increased energy output with respect to the current operating condition when the third amount of energy is less than the second amount of energy.

19. The method of claim 16, wherein:
   the first amount of energy is indicative of an amount of energy output by the engine at a current operating condition; and
   controlling the operation of the engine further includes determining if the current operating condition is a desired engine operating condition.

20. The method of claim 19, wherein:
   the desired operating condition is indicative of an engine operating condition producing a desired amount of emissions; and
   controlling the operation of the engine further includes affecting the engine to operate at another operating condition producing a lower amount emissions with respect to the current operating condition when the current operating condition is not a desired engine operating condition.

* * * * *